Figure 1:
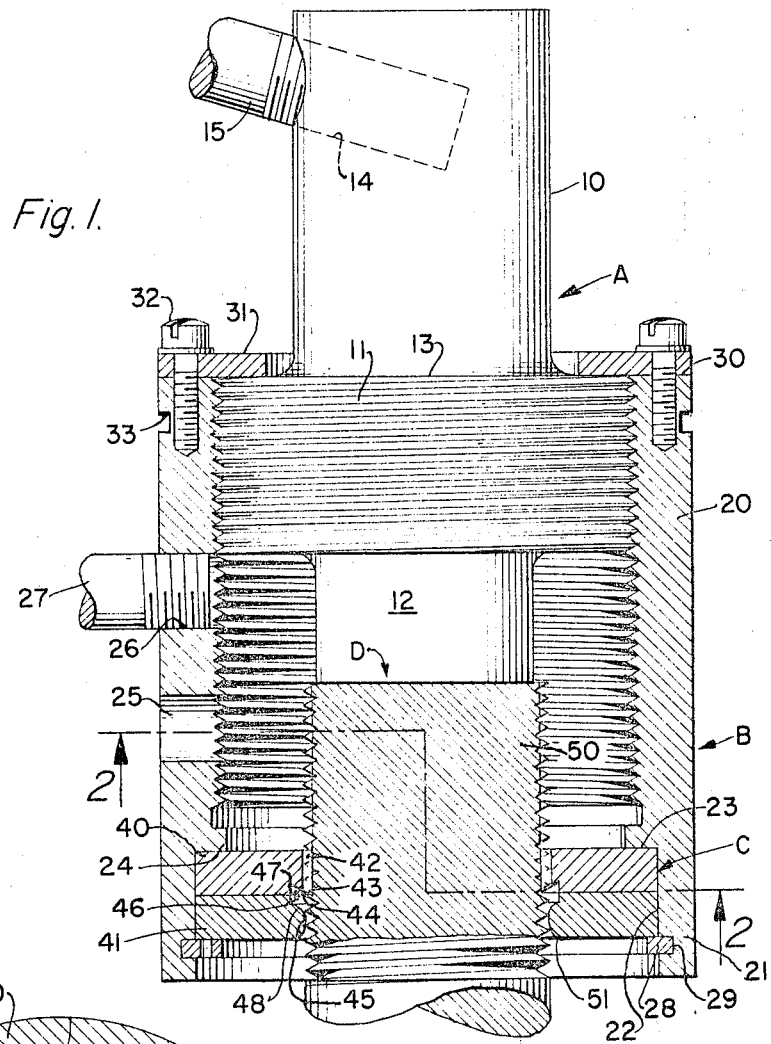

Sept. 13, 1966  F. W. ROHÉ ETAL  3,271,841
TOOL FOR BROACHING SPLINE NOTCHES INTO BOLT OR SHAFT THREADS
Filed June 8, 1964

INVENTORS
FREDERICK W. ROHÉ,
CHARLES S. PHELAN,
BY
Lynn H. Latta
ATTORNEY.

United States Patent Office 3,271,841
Patented Sept. 13, 1966

3,271,841
TOOL FOR BROACHING SPLINE NOTCHES INTO BOLT OR SHAFT THREADS
Frederick W. Rohé, 5191 S. Bradford, Placentia, Calif., and Charles S. Phelan, Tustin, Calif.; said Phelan assignor to said Rohé
Filed June 8, 1964, Ser. No. 373,333
11 Claims. (Cl. 29—95.1)

This invention relates to the art of attaching lock washers to bolts and other threaded shaft or rod members and has as its general object to provide a tool for pre-broaching into such threaded members, spline notches for rotation-resisting attachment thereto of lock washers of the type disclosed in the patent to Edward Kottsieper No. 3,022,809 issued February 27, 1962. Lock washers of this general class have internal spline teeth which in some species are designed for self-broaching and in other species are designed for coupling to pre-broached bolt or shaft threads, with which the present invention deals.

A general object of the present invention is to provide an improved broaching tool for broaching spline notches in male threads of cylindrical members, for the attachment of such lock washers.

The invention provides a broaching tool adapted for broaching notches in the threads of bolts and also in threaded shafts.

For attainment of this general object, the invention provides an improved broaching tool having the following improved characteristics:

(1) Adapted for mounting of the tool in the ram of an arbor press in alignment with a bolt or other threaded member chucked in the bed of the press;

(2) Embodying a ram element for transmitting axial pressure to an annular broaching plate holder;

(3) Providing at the inner end of the ram element a stop for engagement by the end of a threaded member to limit the axial depth to which the threads are notched;

(4) Having an adjustable connection between the ram and the broach plate holder providing expeditious adjustment of such broaching depth;

(5) Utilizing a threaded connection between the ram and the broach plate holder, the latter in the form of an internally threaded sleeve, whereby the adjustment of broaching depth can be effected simply by a threading action of the ram within the sleeve;

(6) Utilizing such threading action between the ram and the holder sleeve to effect screw-jack ejection of the threaded member from the tool when thread notching has been completed;

(7) Embodying a pilot collar of soft material for piloting reception of the end of the threaded member and for guiding it through the broaching plate without damaging the thread;

(8) Embodying a simple but effective arrangement in which such pilot collar and broaching plate are in the form of circular rings securely mounted in directly abutting assembly in a counterbore in an end of the holder sleeve, and further embodying a retainer ring for normally securing the broaching plate and guide collar in the holder and readily removable for removal and replacement of the broaching plate and pilot collar;

(9) Providing for replacement of the guide collar by substitute collars of varying thickness to provide for full broaching into thread relief on threads of varying pitch;

(10) Having a ram that is demountable so that it can be replaced by a tubular ram for operating the broach over a long shaft, and having auxiliary means for coupling the broach to a pulling device for removing it from such a shaft.

Figure 2:
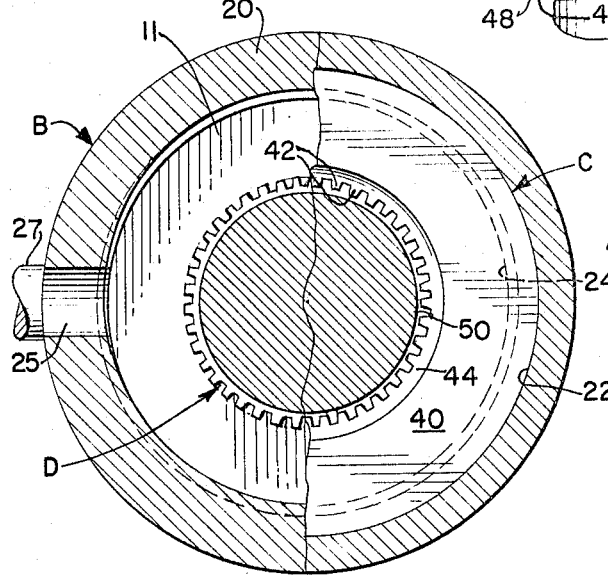

Other objects and advantages will become apparent in the ensuing specification and appended drawing in which:

FIG. 1 is an axial sectional view of a broaching tool embodying the invention, shown in connection with a threaded member, partially in section, in a position where the notching of its threads has just been completed and the threaded member is ready to be ejected from the tool; and FIG. 2 is a transverse sectional view of the same taken on the line 2—2 of FIG. 1.

Referring now to the drawing in detail, I have shown therein, as an example of one form in which the invention may be embodied, a broaching tool comprising, in general, a ram A; an internally threaded broach-holding sleeve B into which the ram A is threaded; an assembly of broaching plate and pilot collar collectively indicated at C; and a threaded cylindrical element (such as a bolt) indicated at D, the threads of which have just been notched by the tool and which is ready to be ejected from the tool.

The ram A comprises a shank 10 having an outer end portion adapted to be chucked into the ram of an arbor press or other means for transmitting axial pressure; an intermediate body 11 of enlarged diameter having a male thread extending from end to end thereof, and an integral stop member 12 on its inner end, preferably in the form of a reduced diameter tip projecting axially from the end of threaded body 11. Defined between threaded body 11 and shank 10 is a radial shoulder 13.

In an intermediate portion of shank 10 is an internally threaded bore 14 extending generally transversely of the major axis of the ram A and providing for the attachment of a wrenching handle 15 to provide for easy turning of the ram A within the holder sleeve B.

Holder sleeve B comprises an internally threaded cylindrical wall section 20 extending from one end thereof throughout a major portion of its length; and a socket portion 21 at its other end, having a cylindrical internal wall 22 defined by a counterbore the bottom of which provides a flat radial annular shoulder 23 adjacent the inner end of threaded sleeve body 20, with an unthreaded internal annular bead 24 preferably being left between the counterbore and the end of the internal thread of sleeve body 20, so as to provide maximum seat area in the shoulder 24.

In the internally threaded sleeve body 20 is a chip blowout aperture 25. The sleeve B is also provided with an internally threaded radial bore 26 for mounting a torque-anchoring handle 27 therein.

In the socket portion 21 of holder sleeve B, near the end thereof, is an internal annular groove 29 in which is detachably mounted any suitable conventional contractile resilient retainer ring 28.

The opposite end of the sleeve B is provided with a square seat 30 to which a stop ring 31 is detachably secured by suitable means such as cap screws 32 threaded into the end of the sleeve B. Stop ring 31 is a flat annular plate projecting inwardly and overhanging the threaded bore of sleeve body 20, for abutting engagement of the ram shoulder 13 thereagainst, but defining an opening of sufficient diameter to freely receive the shank 10 of the ram A. Stop ring 31 functions to limit the unthreading retraction of ram A from sleeve B at a limit position where its inward stop projection 12 will determine maximum depth of thread notching in the operation upon the threaded member D.

Adjacent the stop ring seat 30, in the periphery of holder sleeve B, is an annular groove 33 for coupling the sleeve to a pulling device when ram A is detached from the sleeve.

Assembly C consists of a pair of replaceable flat annular plate elements, namely, a broaching plate 40 and a pilot collar 41 which are snugly mounted within socket 21 with cylindrical peripheries thereof fitted closely to the cylindrical internal wall 22 of the socket so that the broach plate and pilot collar are secured in accurate coaxial assembly with the sleeve B. The broaching plate 40 has a flat inner face which is seated against the radial annular shoulder 23 at the bottom of the socket counterbore; the two annular members 40, 41 have flat adjoining sides which are in flat face-to-face engagement; and the pilot collar 41 has an outer face that is abutted by the retainer ring 28 so to securely retain the assembly C in the socket 21. Broaching plate 40 and pilot collar 41 are one-piece ring elements which can readily be removed when worn and replaced by corresponding ring elements of new condition.

Pilot collar 41 can be removed at will and replaced by substitute collars of different axial thickness to adjust the tool for the broaching of threads of varying pitch, with full broaching into the thread relief in each instance. It is contemplated that the thickness of the body of pilot ring 41 may be varied without varying the thickness of the peripheral portion which is fitted snugly between retainer ring 28 and broach plate 40.

Broach plate 40 has a cylindrcal array of internal broaching teeth 42 extending parallel to the major axis of the assembly and having leading edges 43 of chisel form defined by an undercut annular groove 44 in the outer face of broach plate 40. The leading edges 43 are cutting edges adapted for lancing (notching) through the peripheral portions of the threads of the member D without leaving objectionable burrs along the notched edges.

The pilot collar 41 is of a soft material (e.g. an aluminum alloy softer than the threaded exterior of the member B to be broached). The broach ring 40, on the other hand, is of an extremely hard material such as hardened tool steel or Carbaloy considerably harder than the material of the threads of work member D. The broaching teeth 42 project inwardly to a diameter intermediate between the major diameter and the base diameter of the threads to be broached in member D.

The pilot ring 41 has a smooth cylindrical internal bearing wall 45 extending from its outer face to a radial plane short of its inner face, and has a counterbore 46 extending from the inner side of guide wall 45 to the common plane of the abutting faces of ring members 40, 41. Thus there is defined between the counterbore 46 and the annular groove 44 of broach plate 40, an annular chamber 47 for reception of the chips that are removed from the threads of work member D during a broaching operation. A rounded shoulder 48 at the bottom of counterbore 46 provides a sloping surface from which the chips may slide through the central opening in pilot collar 41 and be discharged when the work member D has been ejected from the tool. Any chips remaining within the sleeve B can be blown out of the sleeve B by application of a suitable air jet nozzle to the blow-out aperture 25.

In the operation of the tool, the threads 50 of work member D will be notched to a portion of their depth, sufficiently to provide adequate torque anchorage for the lock washer to be thereafter attached to the bolt, but sufficiently shallowly to avoid any jamming or clogging of the broaching teeth against the threaded periphery of the work member D.

In operation of the tool, the threaded work member D is suitably chucked in the bed of an arbor press or punch press or other suitable axial pressure-applying apparatus; and the shank 10 is correspondingly chucked in the axially movable, opposed ram of the apparatus. It will be understood that the press apparatus is a device such that these chucking operations will automatically effect axial alignment of the tool with the threaded work member D.

The ram of the press apparatus is then caused to move toward the chucked work member D by hand or power, as the press apparatus may provide, until the opposed end of the threaded work member D enters the pilot collar 41. A rounded corner 51 between the bearing wall 45 and the outer face of collar 41 assists in guiding the (normally chambered) end of work member D into the pilot collar 41. The bearing wall 45 of the pilot collar, which is of a diameter to be snugly fitted to the apex diameter of the threads 50, without binding or seizing or impeding the smooth passage of the threaded surface, will provide any slight realignment necessary to accurately establish coaxiality between the threaded work member D and the broaching teeth 42. The threaded work member D, thus supported in coaxial relation to the broaching teeth, will be passed through the broaching plate 40 as the tool is forced over the work member D. The end of the broaching pass is positively determined by abutting engagement of the stop projection 12 against the end of the work member D, thus determining the depth to which the spline notches are broached in the threads 50.

The depth of the broaching pass can readily be adjusted by threading the ram A forwardly into the sleeve B from the limit position determined by abutment of its shoulder 13 against stop ring 31.

After the broaching pass has been completed, the work member D is ejected by rotating the holder B to advance it upwardly on ram A, thus causing the stop 12 to eject the work member D from the broach plate 40.

For broaching threads in the intermediate area of a shaft, at a substantial distance from either end thereof, the abutment plate 31 and ram A may be detached from the sleeve B, and a driving tube having in one end a counterbore to snugly receive the end of holder sleeve B can then be fitted over the sleeve B and used to transmit pressure from a press to the sleeve, with the adjacent end of the shaft entering the driving tube. At the end of such a broaching operation, a long gear-puller can then be coupled to the end of holder sleeve B, hooking into groove 33, and used to retract the broach from the shaft.

We claim:

1. In a tool for broaching spline notches in threads of a threaded element, in combination: a sleeve having an internal thread extending inwardly from one end thereof and having a socket in its other end; an annular broach plate secured in said socket; and a ram having a male threaded part coupled in said internal thread and means on the outer end of said threaded part for transmitting axial pressure to said sleeve so as to effect a broaching pass of said broach plate over threads of a threaded element supported in opposed axially aligned relation to said broach plate, said ram further including a stop on the inner end of said threaded part, engageable with the end of said threaded element to limit the axial extent of said pass, said ram being rotatable in said sleeve with a threading action for adjusting the depth of said stop within the sleeve, thereby to vary the extent of said pass as limited by said engagement of the stop against the threaded element.

2. A broaching tool as defined in claim 1, wherein said internal thread extends into said sleeve to a depth beyond the range of stop positions of said threaded part, whereby said ram is operable, by threading it into the sleeve after completion of a broaching pass, to eject the broached threaded element from said broach plate.

3. A broaching tool as defined in claim 2, wherein said internal thread extends continuously from said one end of the sleeve to a point closely adjacent said broach plate.

4. A broaching tool as defined in claim 1, further including a guide ring of a material sufficiently softer than the threads of said threaded element to avoid damage to the threads under scraping engagement thereagainst, said guide ring having an inner wall engageable against said threads with a piloting guide engagement sufficiently snug to maintain coaxiality of said threads and said broach plate while permitting free sliding movement of the guide ring over said threads.

5. A broaching tool as defined in claim 1, further including a guide ring of a wear-resistant metal sufficiently softer than the threads of said threaded element to avoid damage to the threads under scraping engagement thereagainst, said guide ring having an inner wall engageable against said threads with a piloting guide engagement sufficiently snug to maintain coaxiality of said threads and said broaching plate while permitting free sliding movement of the guide ring over said threads.

6. In a tool for broaching spline notches in threads of a threaded element, in combination: a sleeve having an internal thread extending inwardly from one end thereof and having a socket in its other end; an annular broach plate secured in said socket; and a ram having a male threaded part coupled in said internal thread and a shank on the outer end of said threaded part for transmitting axial pressure to said sleeve so as to effect a broaching pass of said broach plate over threads of a threaded element supported in opposed axially aligned relation to said broach plate, said ram further including a stop on the inner end of said threaded part, engageable with the end of said threaded element to limit the axial extent of said pass, said ram being rotatable in said sleeve with a threading action for adjusting the depth of said stop within the sleeve, thereby to vary the extent of said pass as limited by said engagement of the stop against the threaded element.

7. A broaching tool as defined in claim 6, wherein said threaded part projects radially beyond the diameter of said shank and thereby defines a substantially radial shoulder at its junction with said shank; and further including a stop ring secured to said one end of the sleeve, extending inwardly and overhanging said internal thread, thereby providing a stop abutment for engagement by said shoulder to provide a limit position of retraction of said ram with reference to said sleeve.

8. A broaching tool as defined in claim 7, including means demountably securing said stop ring to said sleeve so as to provide for detachment of the ram from the sleeve and its replacement by an alternative pressure-applying part.

9. In a tool for broaching spline notches in threads of a threaded element in combination: a sleeve having at one end a ram for transmitting axial broaching movement thereto and having a socket in its other end; an annular broach plate secured in said socket; and a guide ring secured in said socket in abutting relation to said broach plate adjacent said other end, said guide ring being of a material sufficiently softer than the threads of said threaded element to avoid damage to the threads under scraping engagement thereagainst, said guide ring having an inner wall engageable against the threads of said threaded element with a piloting guide engagement sufficiently snug to maintain coaxiality of said threads and said broaching plate while permitting free movement of the guide ring over said threads.

10. A broaching tool as defined in claim 9, wherein said broach plate has peripheral broaching teeth extending parallel to its axis, said teeth having forward cutting edges of chisel form with undercut outer faces defined by an annular groove in the forward end face of said broaching plate.

11. A broaching tool as defined in claim 10, wherein said sleeve has an internal retainer groove adjacent said other end, and including a split resilient retainer ring secured in said groove in abutting relation to said guide ring, whereby guide rings of varying thickness can be selectively used to provide for full broaching into thread relief in threads of varying pitch, said socket having an annular bottom shoulder against which said broach plate is secured by said guide ring.

12. The invention as disclosed in the foregoing specification and appended drawing.

No references cited.

WILLIAM W. DYER, JR., *Primary Examiner.*

HARRISON L. HINSON, *Examiner.*